H. C. Smith.
Lath-Machine.
№ 2858 Reissued Feb. 11, 1868
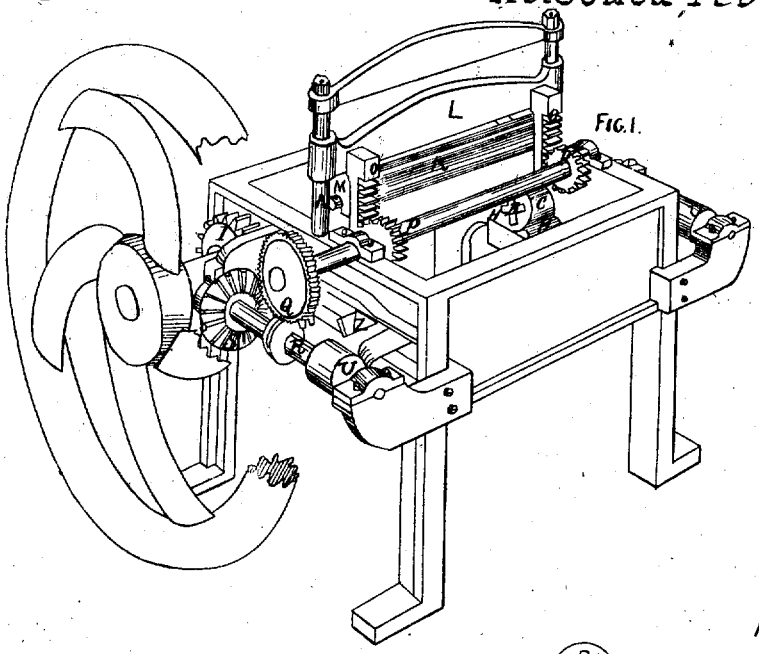
FIG. 1.
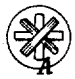
FIG. 5
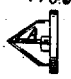
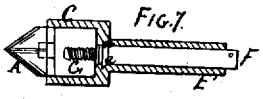
FIG. 7.
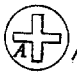
FIG. 6.
FIG. 3.
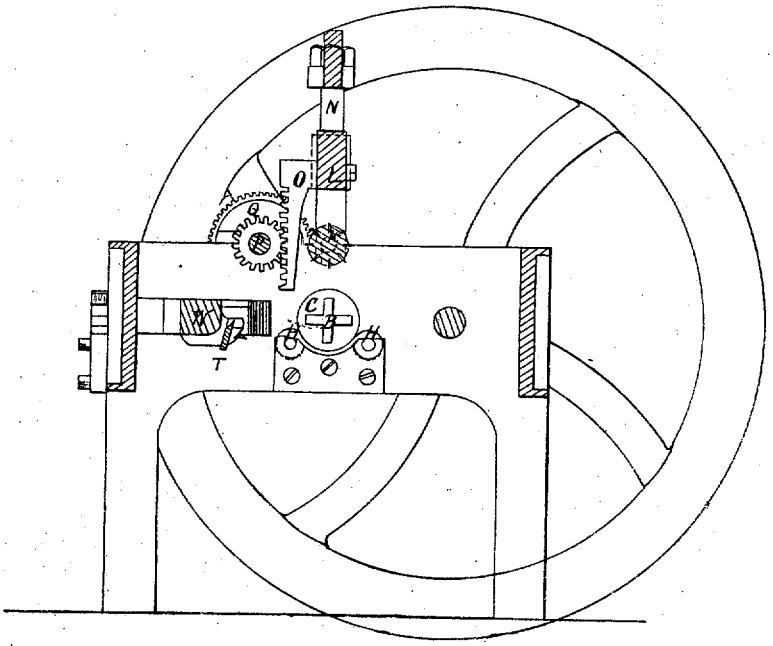

H. C. Smith.
Lath-Machine.

No 2858

Reissued Feb. 11, 1868

UNITED STATES PATENT OFFICE.

JONATHAN C. BROWN, OF BROOKLYN, N. Y., ASSIGNEE OF HENRY C. SMITH.

IMPROVEMENT IN LATH-MACHINES.

Specification forming part of Letters Patent No. 9,286, dated September 28, 1852; extended seven years; Reissue No. 2,858, dated February 11, 1868.

*To all whom it may concern:*

Be it known that HENRY C. SMITH, of Cleveland, in the county of Cuyahoga and State of Ohio, did invent certain new and useful Improvements in Machinery for Cutting Laths from a Revolving Log, which was also applicable to other purposes, for which improvements he obtained Letters Patent of the United States dated the 28th September, 1852, for fourteen years, and the same was extended for the further term of seven years; and it appearing that the description and claim affixed to the original Letters Patent were defective, the following is substituted therefor, more perfectly describing the invention, and clearly claiming the novelties therein, referring to the original drawing, a copy of which is hereto attached, in which—

Figure 2:
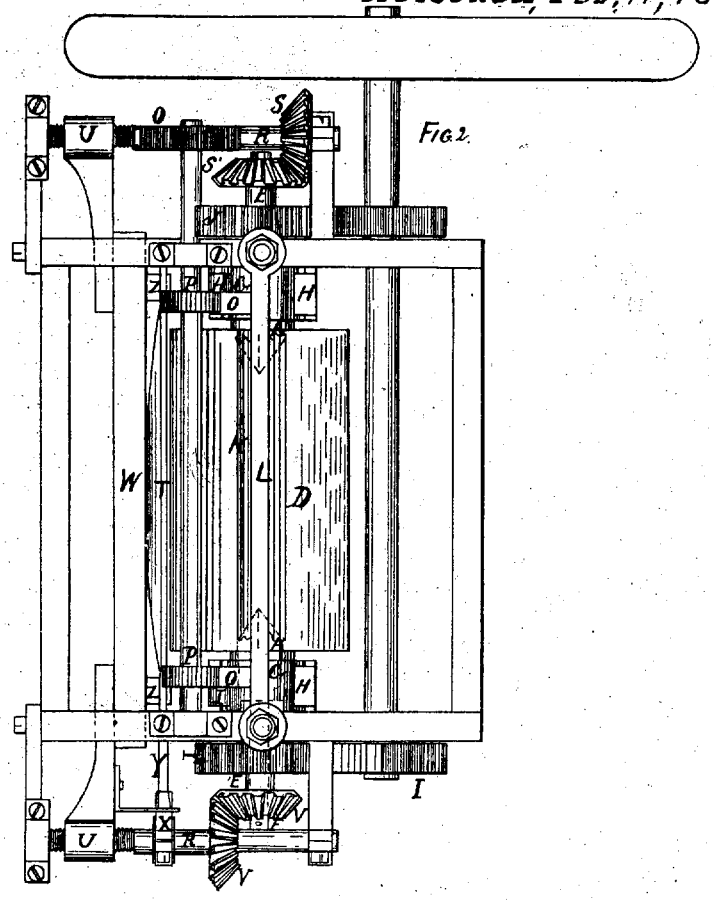
Figure 4:
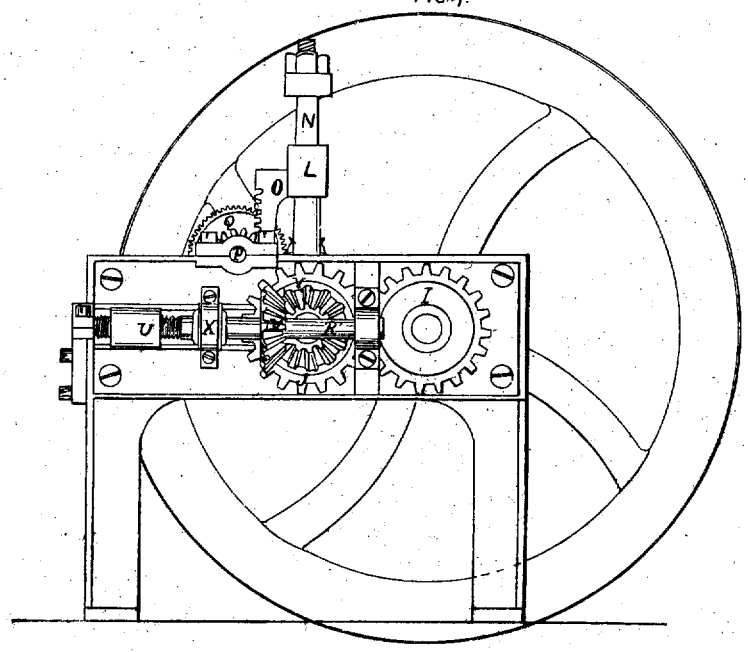

Figure 1 is a perspective view. Fig. 2 is a top plan. Fig. 3 is a vertical section. Fig. 4 is a side elevation; Figs. 5, 6, 7, 8, dog for holding the log, detached.

The purpose of this invention is to cut lamina from around the surface of a revolving log, of the required thickness, by a knife placed on a sliding carriage, fed up toward the center by mechanism, the log being first scored or cut into by parallel knives radiating from the surface of a cylinder, so that as the lamina is removed it shall be in the form desired for use. To effect this object, the machine is constructed as follows:

At the center of a suitable frame there are two mandrels, E E′, in line with each other, on the inner ends of which are clutches C C′, that receive the dogs A, (see Fig. 5,) that are driven firmly into the ends of the log, properly centered, and by which the log can be readily and securely affixed to the two mandrels by which it is revolved. To revolve the two mandrels simultaneously, so as to prevent any twist or strain upon the log and cause it to revolve truly and steadily, there is a spur-wheel, J J′, keyed one on each mandrel E E′, which gear into wheels I I′ on the driving-shaft. This brings the revolving power equally on both ends of the log.

The cutting apparatus consists of a cylinder of knives, K, parallel with the axis, and radiating from the center thereof. This cylinder of knives K is hung in a sliding frame, L, over the log, as clearly seen in the drawing, in bearings M, the frame L sliding on guides N. The cylinder K is drawn down upon the log by means of the racks O, one on each end, moved by pinions P on a shaft geared at Q, into which a worm-wheel, R, works, connected by bevel-gear *s v* with the mandrels. In this way, as the log revolves, the knives on cylinder K are driven down into the log, which, by its revolution, turns the knife-cylinder, cutting into the log a series of scores parallel with the axis of revolution to the depth required to be removed by the stripping-knife, hereinafter described.

The stripping-knife T is a long straight knife, held at a fixed angle to the log being cut in a sliding carriage or beam, W. On each end of this sliding carriage W there are nuts *u*, projecting beyond the frame, through which a screw cut on the end of each of the shafts R runs, by which the knife is advanced as it shaves or strips the lamina from the surface of the log after being cut into form by the radial knives aforesaid.

To facilitate the action of the knife T it may have a vibrating motion endwise, so as to give a draw cut in the shaving or stripping operation. To effect this it is held at its proper and fixed angle by metal arms or ways *z z*, in which it slides, the motion being given by an eccentric, *x*, connected by the pitman *y* with the knife, as seen in Fig. 2.

Having thus fully described the improvements for cutting lamina into form, what I claim as the invention of the said HENRY C. SMITH is—

1. Turning the log to be cut by driving the mandrels at each end thereof by gearing them directly with the driving-shaft, substantially as and for the purposes set forth.

2. The dog A and its appurtenances, for connecting the log with the mandrels and disconnecting it therefrom, as specified.

3. The combination of the cylinder-cutter K and the stripping-knife, moved up simultaneously and automatically, all substantially as and for the purposes set forth.

In testimony whereof I hereunto set my hand this 27th day of November, 1867.

J. C. BROWN,
*Assignee of the patent of Henry C. Smith.*

In presence of—
J. J. GREENOUGH.
S. G. CLARKE.